United States Patent [19]

Otzen et al.

[11] 4,249,709
[45] Feb. 10, 1981

[54] MECHANISM FOR THE AUTOMATIC SPOOLING OF SAFETY BELTS

[75] Inventors: Uwe Otzen, Rottweil; Peter Grüner, Schramberg, both of Fed. Rep. of Germany

[73] Assignee: Hugo, Kern & Liebers & Company, Schramberg, Fed. Rep. of Germany

[21] Appl. No.: 39,692

[22] Filed: May 16, 1979

[30] Foreign Application Priority Data

May 17, 1978 [DE] Fed. Rep. of Germany ....... 2821491

[51] Int. Cl.$^3$ ...................... A62B 35/00; B65H 75/48
[52] U.S. Cl. ................................................ 242/107.3
[58] Field of Search .... 242/107, 107.3, 107.4 R–107.4 E; 280/801–808; 297/475–480

[56] References Cited

U.S. PATENT DOCUMENTS

| 3,664,598 | 5/1972 | Sherman | 242/107.3 |
| 3,957,223 | 5/1976 | Colasanti et al. | 242/107.4 R |
| 4,126,282 | 11/1978 | Morita et al. | 242/107 |

FOREIGN PATENT DOCUMENTS

| 2256493 | 5/1973 | Fed. Rep. of Germany .... 242/107.4 R |
| 2526630 | 12/1976 | Fed. Rep. of Germany .... 242/107.4 R |

Primary Examiner—John M. Jillions
Attorney, Agent, or Firm—Lackenback, Lilling & Siegel

[57] ABSTRACT

A mechanism for the automatic respooling of safety belts including a belt spindle rotatable in a housing and including a roll-up spring tensioned by the pull out of the belt and engaged by the belt spindle, and a friction brake relieving the belt pull back force. The friction brake including a first friction element connected to the belt spindle and a second friction element rotatably mounted and continuously in frictional engagement with the first friction element, and wherein the second friction element is fixed in angular relationship on the housing by means of a stop lever. The apparatus further comprises an automatically-functioning two-arm stop lever having a slot which is disposed about a pivot pin attached to said housing and said lever is pivoted on said pin and displaced or movable along said slot. A spring engaging the two-arm lever in such a way that the point of contact of the spring, upon sliding of the lever from the one side of the pivot pin, moves to the other side and thereby selectively one of the two arms of the lever is engageable with the circumference of the second friction element, and on the circumference of the second friction element at least one cam is provided which is engageable by the stop lever against a radial tilting upon rotation of the second friction element in a direction of respooling said belt. The cam has on one of its flanks a step which is engageable with the second arm of the lever for sliding the lever upon rotation of the second friction element in a direction of belt extension. Thus, the mechanism brakes only the pulling in of the belt when it is used and worm by a party. As the belt is attached to the body of the person during use with only a slight pulling back force, it is not inconvenient.

8 Claims, 2 Drawing Figures

MECHANISM FOR THE AUTOMATIC SPOOLING OF SAFETY BELTS

BACKGROUND OF THE INVENTION

The invention relates to a mechanism for the automatic spooling of safety belts, including a belt spindle rotatable in a housing, upon which the belt is affixed and which is engaged by a tensionable retraction spring during the extension of the belt.

Automatic safety belts, such as utilized in particular in automobiles as well as in other types of airborne, surface and waterborne vehicles, should, among others, exhibit two characteristics.

The released belt should be respooled in a reliable manner, which implies a high belt retraction force for the rewind spring. The belt, as worn, should, on the other hand, impede the user as little as possible, which, in turn, implies the lowest possible belt retraction force for the rewind spring.

Several approaches are known through which these, mutually contradictory, demands can be reconciled with one another. For example, a rewind spring with negative spring characteristics may be used. With such a spring a substantially uniform torque is exerted on the belt spindle, independent of the length of extension of the belt. This results, in the very least, that the tension force exerted on the user of the applied belt is not greater than the rewind force at the end of the respooling process. However, the minimal rewind force required for an absolutely reliable re-spooling still acts on the user with the belt applied.

A substantial improvement is attained when an S-shaped spiral spring, wound onto two spindles, with a negative spring curve is used, as known from the prior art. With this known mechanism a substantial reduction in the rewind force acting on the applied belt is achievable, over that exerted at the end of the re-spooling process. However, the winding of the return spring on two spindles requires, necessarily, a detrimental enlargement of the dimensions of the respooling mechanism.

Further, mechanisms are known wherein, additionally to the rewind spring and opposing it, a weaker drive spring engages the belt spindle.

The expense, implied by the additional drive spring is disadvantageous; its dimensions define the retraction length over which the compensation of the rewind spring is effective.

SUMMARY OF THE INVENTION

The invention has the object to so structure a mechanism of the art described in the opening paragraph that a partial compensation of the retraction force of the rewind spring is achieved when the belt is worn, through means simple in construction, and, consequently, cheap in manufacture.

This and other objects of the invention are attained through a friction brake, whose braking torque, exerted on the belt spindle, is smaller than the drive torque of the rewind spring acting on the belt spindle, and through a control device for the switching of the friction brake between alternative positions, one where it acts on the belt spindle, and another one in which the belt spindle is released.

In the mechanism according to the invention a spring drive with a single axis can be utilized for the belt spindle, permitting small dimensions for the entire installation. Since, with the belt applied, the friction brake compensates the rewind force to a large extent, only a small retraction force remains effective, so that the belt, as worn, is not disturbing to the user. Furthermore, in the case of unfavorable locating positions for the belt system, a strong retraction spring may be used, so that a reliable retraction of the belt may be guaranteed as soon as the friction brake is released. A particular spring characteristic of the retraction spring is not required which influences the production costs favorably.

The mechanism of the invention can be produced very simply and with a high reliability and long service life. Advantageously, a drum is provided, rotatable in the housing, constituting one friction element of the brake, while the other frictional element is attached to the belt spindle. The frictional elements of the brake are in constant contact, so that an expensive, and unreliable, control device for the brake may be dispensed with. The required brake torque can be accurately set and maintained over the entire life of the installation. To switch the brake into its active state, the drum is restrained with respect to the housing, which can be achieved simply, for example by the use of an engagement lever. Should the drum, for example through the disengagement of the lever, be allowed to rotate freely, it can rotate with the belt spindle and no braking action is generated.

In a particularly simple manner of construction, the brake can be realized through the use of a slider spring attached to the belt spindle, pressed against the inner surface of the drum; with the drum itself constructed as a hollow cylinder freely rotatable on the belt spindle with a locking lever selectively engaging its outer surface.

For a particularly simple and automatic control of the brake, the engagement lever can be constructed as one arm of a two-armed see-saw lever or rocker arm, which is brought into contact with the outer surface of the drum with one or the other of its arms as a result of spring loading. The arm developed as the engagement lever serves to block the rotation of the drum, when the belt is extended and applied. The other lever serves to bring the engagement lever into touching contact with the outer surface of the drum so that it can lock thereto, as soon as the belt extension process is complete and the belt is applied.

The mechanism according to the invention is very economical in construction cost and in installation, since only a few and simple components are required. The drum and the see-saw lever are simple plastic injection-molded parts. The slider spring of the brake and the hairpin spring for the operation of the see-saw are also simple and inexpensive components of manufacture. Additional components are not required.

The small number of individual parts and their simplicity guarantee a high degree of functional reliability for the mechanism. The wear and mechanical loading of the component parts is so minimal that the service life meets the requirements, for example when used in an automobile safety belt, without much trouble.

DESCRIPTION OF THE PREFERRED EMBODIMENTS

Figure 1:
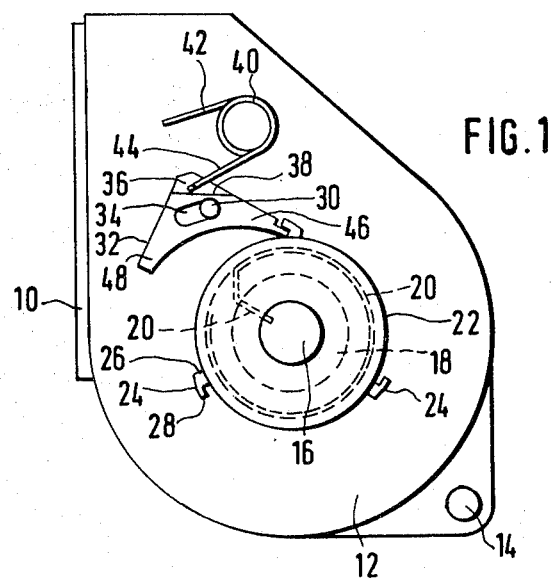
FIGS. 1 and 2 are plan views of a mechanism for the automatic respooling of safety belts in two different operating states.

The mechanism is provided with a housing comprising a mounting base plate 10 and sidewalls 12 orthogonal thereto. The sidewalls 12 are interlocked by means of a pin 14, remote from the mounting plate 10. A belt spindle 16 is rotatably journalled in the sidewalls 12. The belt is fixed to the belt spindle 16 intermediate the sidewalls 12. A retraction spring, not shown in the drawing, is wound up by the belt spindle 16 during the extension of the belt and drives the belt spindle for the respooling of the released belt.

Further there is an inertial brake device, also not shown in the drawing, which locks the belt spindle in the event of an impulse loading of the belt. All these details are developed in a known manner as set forth in the art, so that their description and representation in the drawing is not necessary.

The belt spindle projects beyond the sidewall 12 visible in the drawing with a stub. On this projecting stub a slider spring 20 is affixed in a collar 18. The slider spring 20 is radially inset in the collar 18 of the stub of belt spindle 16 and runs in a substantially spiral winding and presses against the inner peripheral surface of a drum 22.

The drum 22 is a plastic injection molded part in the form of a flat hollow cylinder. One axial base surface of the drum, facing the sidewall is open, while the outer base surface is closed and sits as a concentric hub on the end of the stub of the belt spindle 16 projecting beyond the collar 18, in a freely rotatable manner. The drum 22, therefore, encloses the slider spring 20 and covers it simultaneously against the outside axially. The drum 22 is secured axially to the belt spindle 16 by means of a locking ring, not shown.

Three cams 24 are positioned, in equiangular positions with respect to one another, on the outer surface of the drum 22. The cams 24 show a flat rising flank, in a clockwise sense in the representation of the drawing. The flat rising flank is terminated in a radially aligned cut 26. The flank of the cam 24 facing the counterclockwise rotational sense is developed into a projection 28 spaced from the outer surface of the drum.

To a side of drum 22 a pivot pin 30 is mounted in the sidewall 12. A double-armed see-saw lever 32 is located on the pivot pin 30 by means of a locating ring not shown. The two arms of the see-saw 32 are aligned with an obtuse angle, open toward the drum, between them. In the region of the vertex of the see-saw lever 32 an elongated slot 34 is provided, aligned with the length of the lever, which is pierced by the pivot pin 30, so that the see-saw 32 may be pivoted on the pin 30 as well as displaced along the slot 34.

Outboard of the slot 34 in the vertex region of the triangular see-saw lever 32 there is a step-like bend 36. By means of this bend 36 a support surface 38 is formed which is orthogonal to the plane of the lever 32 and is slightly tilted with respect to the orthogonal direction to the bisector of the obtuse angle therein, as visible in the drawing.

A hairpin 40 is affixed with one leg 42 to the sidewall 12 and bears against the support surface 38 of the see-saw lever 32 with its other, free leg 44. The spring leg 44 is suitably retained in the bend 36 through the use of a conventional retaining ring (not shown) located on pin 30 and projecting beyond the step-like bend 36.

A right arm 46 of the double-armed see-saw lever 32—as seen in the representation of the drawing—is developed as the engagement lever, so that it can interlock with the cam 24 under the projection 28, as shown in FIG. 1. In this position, the lever arm 46 is prevented, by the projection 28, from radially departing from the surface of the drum 22. The second arm 48 of the see-saw lever 32 is flattened at its forward end, so that it may engage the tab 26 of the cam 24 when it is lying against the surface of the drum 22, as shown in FIG. 2.

The manner of operation of the mechanism is described below:

Should the lever 32 be found in its position displaced to the left, so that the pivot pin 30 is positioned at the right end of the elongated slot 34, then the leg 44 of the hairpin spring 40 presses against the bearing surface 38 to the left of the pivot pin 30, as shown in FIG. 1. Consequently, the second arm 48 of the see-saw lever 32 is urged toward the periphery of the drum 22 by the hairpin spring 40.

Figure 2:
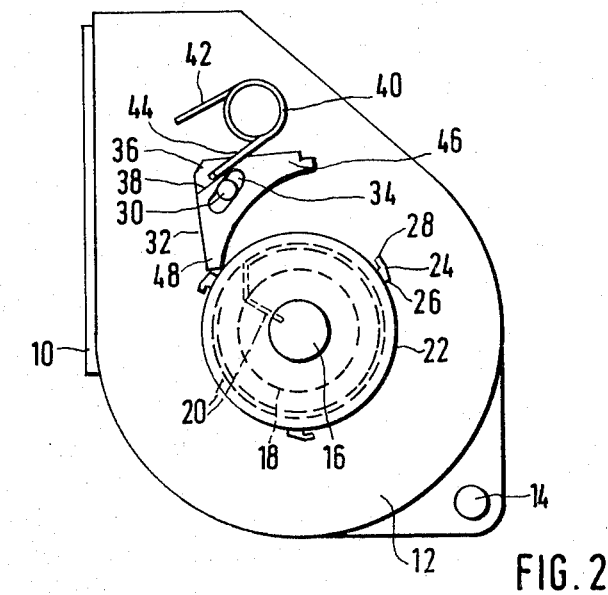

Should the lever 32 be found in its position displaced to the right, then the hairpin spring 40 presses against it to the right of the pivot pin 30, as illustrated in FIG. 2. In this position the arm 46, developed as the engagement lever, is urged towards the periphery of the drum 22 by the hairpin spring 40.

Should the belt, spooled on the belt spindle 16, be drawn out, then the belt spindle 16 turns in a clockwise sense, in the illustration of the drawing. The retraction spring, not shown in the drawing, is wound up at this time. With this rotation of the belt spindle 16, the drum 22 is entrained into clockwise rotation by the slider spring 20 through the friction forces developed therebetween.

Should the lever 32 be in such a position at this time that the right arm 46 is proximate to the surface of the drum, then the lever 32 does not interfere with the rotation of the drum 22, since the arm 46 can slide over the rising flat flank of the cam 24. Should the see-saw lever be positioned, on the other hand, with the second arm 48 pressed against the surface of the drum 22 by the hairpin spring 40, then the rotation of the drum 22 brings the next cam 24 into contact with the flattened end of the arm 48 and pushes the lever 32 to the right, into the position shown in FIG. 2. Now, however, the hairpin spring 40 presses to the right of the pivot pin 30 against the surface 38. The lever flips over, therefore, and comes to rest with its right arm 46 against the surface of the drum 22. The drum 22 may, therefore, be entrained without hindrance in a clockwise sense by a further extension of the belt.

When the belt is fully extended and applied (buckled on) by the user, then the wound-up retraction spring rotates the belt spindle in a counterclockwise direction, that is in the direction of belt retraction. During this process the drum 22 is entrained by the slider spring 20 in a counterclockwise sense, until the next cam 24 comes into contact with the arm 46 of the flip-flop lever 32, lying against the surface of the drum 22.

The cam 24 displaces the lever 32 to the left, into the state depicted in FIG. 1. In this position the hairpin spring 40 presses against the bearing surface 38 to the left of the pivot pin 30, yet the lever 32 cannot be rotated since the projection 28 prevents the radial withdrawal of the engaged lever arm 46.

In this operating position, shown in FIG. 1, with an applied belt, the belt spindle 16 is rotated by the retraction spring in a counterclockwise direction, to respool the belt. But, since the drum 22 is held stationary by the engagement lever 46, the slider spring 20, rotating together with the belt spindle 16, cannot entrain the drum 22 and rotates in frictional contact with the inner surface of the drum 22.

The braking torque developed by this frictional force acts on the belt spindle 16 and largely compensates the drive torque exerted on the belt spindle 16 by the retraction spring, so that the belt is drawn inward only by the remaining, small net torque. The user is subjected, therefore, only to a very small belt retraction force, which is not experienced as troublesome.

Should the belt be released, then a negligible extension of the belt is sufficient to rotate the belt spindle 16 in a clockwise sense. This results in the drum 22 being rotated in a clockwise direction by the slider spring 20, as well. The engagement lever 46 is freed from the projection 28 of the cam 24 thereby, and the see-saw lever 32 can flip over, under the urging of the hairpin spring 40, so that it is pressed with its left arm 48 against the outer surface of the drum 22, under the urging of the hairpin spring 40. The retraction spring can now turn the belt spindle 16 in a counterclockwise sense, to respool the belt. The drum 22 is entrained into counterclockwise rotation by the slider spring 20 thereby. The left arm 48, proximate to the outer surface of the drum 22, does not impede the rotation of the drum 22, since it glides over the cams 24. The respooling of the belt is, therefore, accomplished with the full torque of the retraction spring.

Should, by a small movement of the user, the belt be extended by a small amount so that the engagement lever 46 is freed from the projection 28 of the cam 24, then the lever 32 will flip, also, into the state where the arm 48 is brought against the outer surface of the drum 22 and the braking action is foregone. This does not, however, disturb the operation of the mechanism, since even a small extension of the length of the belt is sufficient to bring the next cam 24 into engagement with the left arm 48 of the flip-flop lever 32 and to displace the lever 32 once more to the right into the position shown in FIG. 2, so that it rotates again into the stop position for drum 22 and reinstates the braking action.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

We claim:

1. In an improved apparatus for the automatic respooling of safety belts, said apparatus including a belt spindle having seat belt wound thereon, said belt spindle rotatable in a housing including a roll-up spring engaging the belt spindle and being tensioned upon belt extension, and a friction brake for reducing the belt pull back forces; said friction brake including a first friction element connected to the belt spindle and a second friction element rotatably mounted and continuously in frictional engagement with the first friction element the improvement comprising an automatically-functioning two-arm stop lever having a slot which is disposed about a pivot pin attached to said housing and said lever is pivoted on said pin and movable along said slot; a spring in biasing engagement with said two-arm lever such that the pointof contact of the spring with the lever moves from one side of the pivot pin to the other upon sliding of said lever from one side of the slot to the other thereby selectively engaging one of the two arms of said lever with the circumference of the second friction element, and at least one cam, provided on the circumference of the second friction element, said cam having a first portion engageable with the first arm of said lever for moving the lever to one side of said slot and interlocking said first arm with said second friction element in the direction of respooling said belt thereby actuating said friction brake to provide a reduced belt pull back force; and said cam having a second portion which is engageable with the second arm of the lever upon rotation of the second friction element in a direction of belt extension thereby moving said lever to the opposite side of said slot whereby the first arm becomes biased by said spring against the circumference of the second friction element in preparation for engagement with the first portion of said cam during a subsequent respooling of said belt.

2. The improved apparatus according to claim 1, wherein said second friction element is a drum rotatably journalled in said housing.

3. The apparatus according to claim 2, wherein said drum is a concentric hollow cylinder pivoted on the belt spindle and the inner surface of said hollow cylinder forms one of said friction elements.

4. The improved apparatus according to claim 2, wherein said friction element connected to the belt spindle is a slide spring attached to the belt spindle and engaging the inner surface of said drum.

5. The improved apparatus according to claim 3 or 4, wherein said drum is a hollow cylindrical plastic cap closed on one side and its closed side is seated on the belt shaft as a hub and said drum covering said first friction element.

6. The improved apparatus according to claim 1, wherein the circumference of the second friction element is provided with three cams located equidistantly from each other.

7. The improved apparatus according to claim 1, wherein said spring is a leg spring, one leg of which is fixed on said housing and the other leg contacts said lever.

8. The improved apparatus according to claim 1, wherein said two-arm lever is made from a plastic material.

* * * * *